(12) United States Patent
Van Dyke et al.

(10) Patent No.: US 7,400,327 B1
(45) Date of Patent: Jul. 15, 2008

(54) APPARATUS, SYSTEM, AND METHOD FOR A PARTITIONED MEMORY

(75) Inventors: James M. Van Dyke, Sunnyvale, CA (US); John S. Montrym, Los Altos, CA (US); Steven E. Molnar, Chapel Hill, NC (US)

(73) Assignee: NVIDIA Corporation, Santa Clara, CA (US)

( * ) Notice: Subject to any disclaimer, the term of this patent is extended or adjusted under 35 U.S.C. 154(b) by 442 days.

(21) Appl. No.: 11/051,130

(22) Filed: Feb. 4, 2005

Related U.S. Application Data

(63) Continuation of application No. 09/687,453, filed on Oct. 13, 2000, now Pat. No. 6,853,382.

(51) Int. Cl.
*G09G 5/39* (2006.01)
*G06F 13/18* (2006.01)
*G06F 15/167* (2006.01)
*G06F 12/02* (2006.01)

(52) U.S. Cl. .................. 345/531; 345/535; 345/541; 345/542; 345/544

(58) Field of Classification Search ................ 345/531, 345/535, 540–544, 534
See application file for complete search history.

(56) References Cited

U.S. PATENT DOCUMENTS

| | | | |
|---|---|---|---|
| 5,109,520 A | 4/1992 | Knierim | |
| 5,408,606 A | 4/1995 | Eckart | |
| 5,452,299 A | 9/1995 | Thessin et al. | |
| 5,485,586 A | 1/1996 | Brash et al. | |
| 5,500,939 A | 3/1996 | Krihara | |
| 5,572,655 A | 11/1996 | Tuljapurkar et al. | |
| 5,623,688 A | 4/1997 | Ikeda et al. | |
| 5,625,778 A | 4/1997 | Childers et al. | |
| 5,664,162 A | 9/1997 | Dye | |
| 5,898,895 A | 4/1999 | William | |
| 5,905,877 A | 5/1999 | Guthrie et al. | |

(Continued)

Primary Examiner—Kee M. Tung
Assistant Examiner—Hau H Nguyen
(74) Attorney, Agent, or Firm—Cooley Godward Kronish LLP

(57) ABSTRACT

A memory system having a number of partitions each operative to independently service memory requests from a plurality of memory clients while maintaining the appearance to the memory client of a single partition memory subsystem. The memory request specifies a location in the memory system and a transfer size. A partition receives input from an arbiter circuit which, in turn, receives input from a number of client queues for the partition. The arbiter circuit selects a client queue based on a priority policy such as round robin or least recently used or a static or dynamic policy. A router receives a memory request, determines the one or more partitions needed to service the request and stores the request in the client queues for the servicing partitions. In one embodiment, an additional arbiter circuit selects memory requests from one of a subset of the memory clients and forwards the requests to a routing circuit, thereby providing a way for the subset of memory clients to share the client queues and routing circuit. Alternatively, a memory client can make requests directed to a particular partition in which case no routing circuit is required. For a read request that requires more than one partition to service, the memory system must collect the read data from read queues for the various partitions and deliver the collected data back to the proper client. Read queues can provide data in non-fifo order to satisfy an memory client that can receive data out-of-order.

30 Claims, 19 Drawing Sheets

U.S. PATENT DOCUMENTS

| | | |
|---|---|---|
| 5,923,826 A | 7/1999 | Grzenda et al. |
| 6,104,417 A | 8/2000 | Nielsen et al. |
| 6,115,323 A | 9/2000 | Hashimoto |
| 6,157,963 A | 12/2000 | Courtright et al. |
| 6,157,989 A | 12/2000 | Collins et al. |
| 6,202,101 B1 | 3/2001 | Chin et al. |
| 6,205,524 B1 | 3/2001 | Ng |
| 6,219,725 B1 | 4/2001 | Diehl et al. |
| 6,469,703 B1 | 10/2002 | Aleksic et al. |
| 6,545,684 B1 | 4/2003 | Dragony et al. |
| 6,570,571 B1 | 5/2003 | Morozumi |
| 6,853,382 B1 | 2/2005 | Van Dyke et al. |

APPARATUS, SYSTEM, AND METHOD FOR A PARTITIONED MEMORY

CROSS REFERENCE TO RELATED APPLICATIONS

This application is a continuation application of U.S. patent application Ser. No. 09/687,453, entitled, "Controller for a Memory System Having Multiple Partitions" filed on Oct. 13, 2000, which issued as U.S. Pat. No. 6,853,382 on Feb. 8, 2005, the contents of which are hereby incorporated by reference in their entirety.

FIELD OF THE INVENTION

The present invention relates generally to memory controllers in a computing system and more particularly to a controller for a memory system in which the storage array is partitioned into a number of independent sections.

DESCRIPTION OF THE RELATED ART

In current graphics subsystems, the speed and number of graphical processing elements has increased enough to make the graphics memory subsystem a barrier to achieving the higher performance that these elements may be capable of achieving. Typical graphics processing elements which are the memory clients include the host processor, a texture engine, a z-buffer engine, a color engine, a 2D-graphics engine, a 3D-graphics engine and a display engine.

FIG. 1 shows a graphics memory controller of the prior art. The memory controller 10 acts as a switch to determine which of several graphics processing clients 12, 14, 16, 18, 20 can access the memory storage array 22, which is organized as a single, i.e., monolithic, partition. Each client requests one or more cycles of the memory storage array 22 which transfers, in each cycle, a data quantity equal to the size of the data bus of the array.

Monolithic memory subsystems for the various graphics clients have evolved in an attempt to overcome this barrier chiefly by using a wider memory data bus for increased throughput. Memory busses in current architectures are now 128 bits physically, and 256 bits (32 bytes), effectively, when the minimum data transfer requires both phases of single clock cycle. (Hereinafter, when referring to the size of the data bus, the effective size, rather than physical size is meant.) The size of the memory data bus sets the size of the minimum access that may be made to the graphics memory subsystem and for some devices that make use of the graphics memory, 32 bytes is an acceptable minimum.

However, for many devices in a graphics subsystem, a minimum size of 32 bytes is inefficient. As geometry objects become smaller and finer, a minimum access of 32 bytes transfers more data than is needed by the various graphics engines for the geometry object. One measure of fetching efficiency of the access is the ratio of pixels used for the geometry object to pixels fetched during an access. As the size of the memory bus increases or the minimum access increases, this ratio becomes smaller. A small ratio implies a large amount of wasted memory throughput in the graphics memory subsystem.

FIG. 2 shows a plot of the fetching efficiency of the prior art system of FIG. 1, in which the fetching efficiency is plotted on the vertical scale and the relative number of pixels per triangle is plotted on the horizontal scale. The plot shows that, as the number of pixels per triangle decreases, the fetching efficiency also decreases to a point that becomes unacceptably low for small triangles, i.e., triangles having approximately 10 to 100 pixels. At that point more than half the data fetched is not used for the triangle.

Thus, it is desirable to improve the fetching efficiency to the local memory storage but without altering the view to the memory clients of memory as a single unit to maintain compatibility with existing memory clients.

Monolithic memory subsystems are also inefficient in another way. Because the topology of the array is such that the entire or substantial part of the address path and the control path must reach each device that makes up the memory array, the electrical load on these paths is quite high. This leads to a slower cycle time for the array which translates into a loss of throughput than the array can supply. A partial answer to this problem is the replication and buffering of the address and control paths to portions of the array, which has the effect of increasing the cost of the array to gain a portion of the lost performance.

Therefore, there is a need to improve the efficiency of the memory access and the topology of the array without changing the existing memory clients. Improved efficiency and topology would lead to higher throughputs from the memory array and would lead to better use of the available memory throughput by the graphics subsystem thereby improving the performance of the graphics subsystem without a major impact on the memory clients.

BRIEF SUMMARY OF THE INVENTION

The present invention meets the above need. A system in accordance with the present invention includes a plurality of memory partitions each operable to service a memory request independently of other memory partitions. The memory request includes information specifying a location of requested data in the memory subsystem and a data transfer size for the request. A plurality of client queues, one for each memory client and each partition is also included along with a plurality of routing circuits, wherein one routing circuit is connected to each memory client and to the client queues. Each routing circuit is operative to determine for each request, independently of the other requests, one or more partitions needed to service the request based on the specified location and transfer size, and each routing circuit is operative to route and store, independently of the other requests, each of the requests in the client queues of the one or more servicing partitions. Further included are a plurality of arbiter circuits, one arbiter circuit connected to each partition and to the client queues for the partition, where each arbiter circuit is operative to select, independently of other partitions, based on a priority policy, a request for servicing from one of the client queues for the partition, and to transfer each of the selected requests, independently of the other selected requests, to the servicing partition.

A method of servicing memory requests from at least one memory client in accordance with the present invention includes the following steps. First, at least one memory request from the at least one client is received, where the memory request is directed to a memory subsystem having a plurality of independently operable partitions and includes information specifying a location of requested data in the memory subsystem and a data transfer size for the request. Next, one or more partitions needed to service the request based on the specified location and transfer size are determined and the request is routed to each of the one or more servicing partitions. Following this, the routed request is serviced at each servicing partition independently of the other servicing partitions.

One advantage of the present invention is that, for a given memory size, each partition comprises a smaller number of devices. This reduces or eliminates the need for buffered and replicated address and control paths to the devices thereby improving the topology and cycle time of the partition and therefore the memory system.

Another advantage of the present invention is that, if a client requires only a small transfer, then only a few partitions, perhaps a single partition, of the total memory array is involved in the transfer. This leaves the other partitions of the memory array free to perform other small transfers, thus improving the deliverable throughput of the array. Larger transfers are still possible by splitting the request into a number of smaller requests and submitting the multiple requests to the individual partitions for service.

BRIEF DESCRIPTION OF THE DRAWINGS

These and other features, aspects and advantages of the present invention will become better understood with regard to the following description, appended claims, and accompanying drawings where:

DETAILED DESCRIPTION OF THE INVENTION

Figure 1:
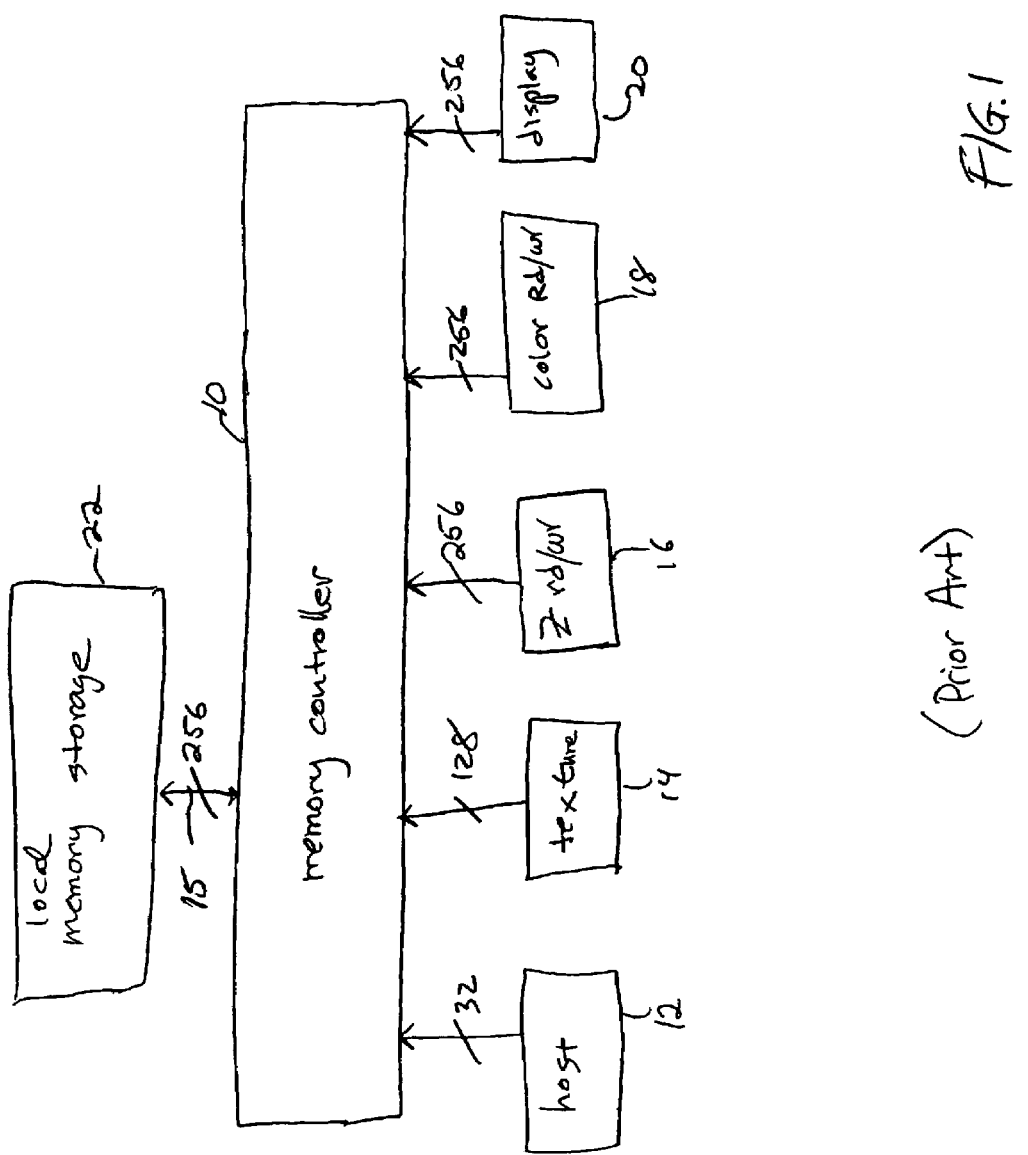
FIG. 1 shows a graphics memory controller of the prior art.
Figure 2:
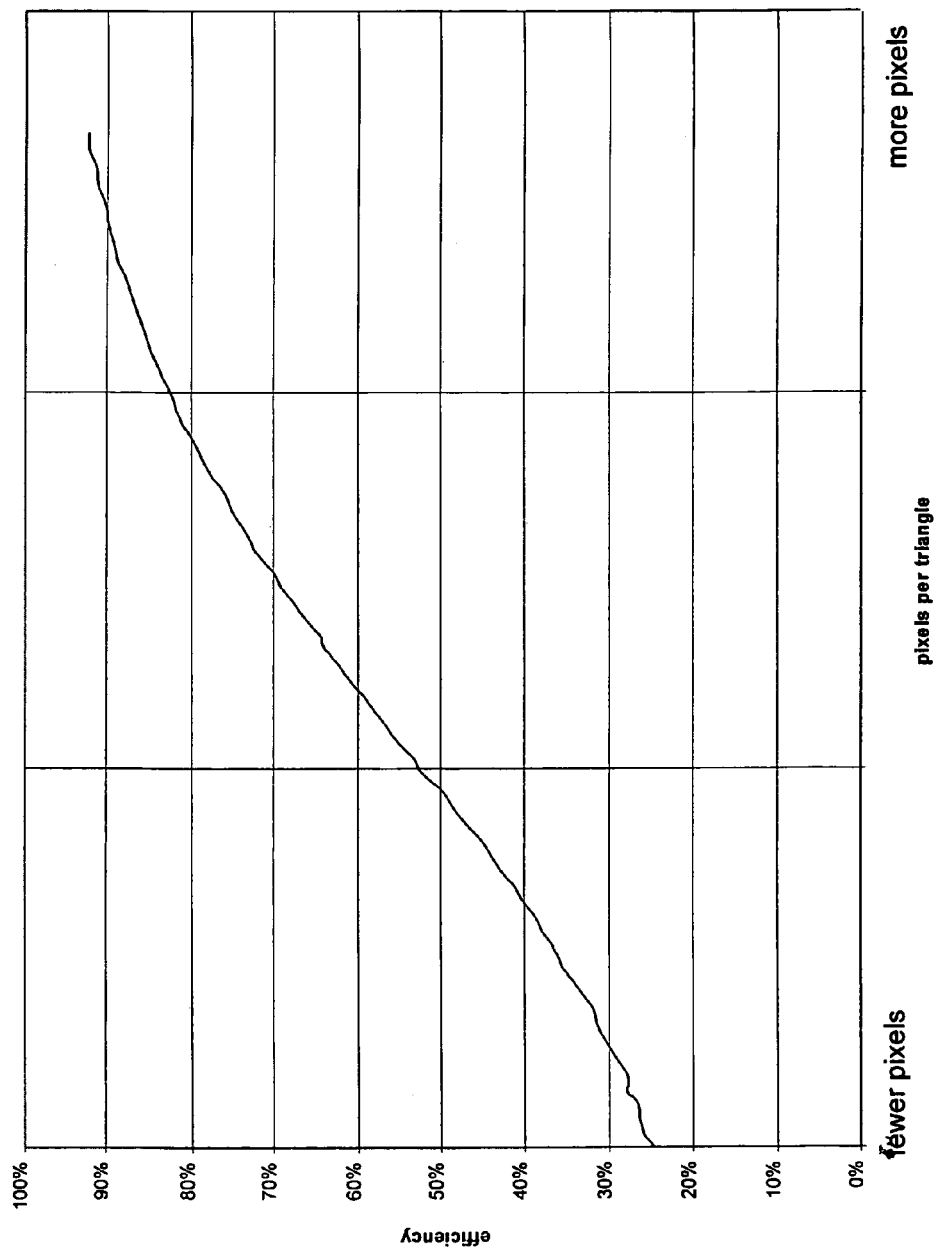
FIG. 2 shows the fetch efficiency of the prior art.
Figure 3:
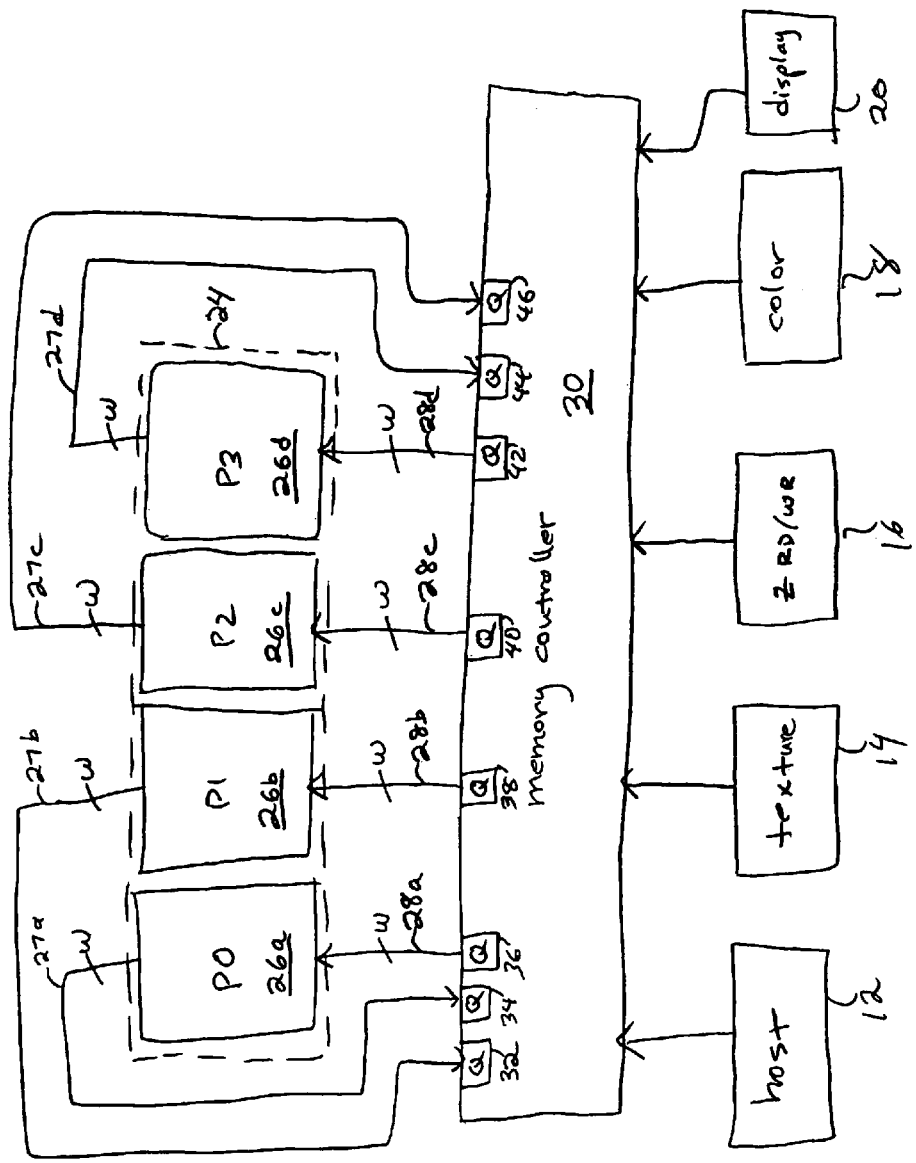
FIG. 3 shows a high-level block diagram of a system in accordance with the present invention.

FIG. 3 shows a high-level block diagram of a system in accordance with the present invention. The figure shows that the memory array 24 has an number of independently operable partitions 26a, 26b, 26c, 26d, each with a bus 28a-28d and a bus 27a-27d having a width w that is preferably a smaller transfer size than the single prior art bus 15 in FIG. 1. In one embodiment, there are four independent partitions P0-P3 26a, 26b, 26c, 26d each with a bus one quarter the size of the non-partitioned bus, i.e., each with a 64 bit bus. Each of the memory system clients 12-20 is connected as before to the memory controller 30 which presents a non-partitioned view of the memory to the clients. The memory controller 30 includes a number of queues 32, 34, 36, 38, 40, 42, 44, 46 that connect to the memory array of each partition and control logic (not shown in FIG. 2) that determines the one or more partitions to which a request should be routed and the one or more partitions from which a response (read data) to a request should be obtained to maintain the appearance of a non-partitioned memory for the clients. Additionally, the control logic in the memory controller arbitrates among the various clients according to a priority assigned to each of the clients.

Figure 4:
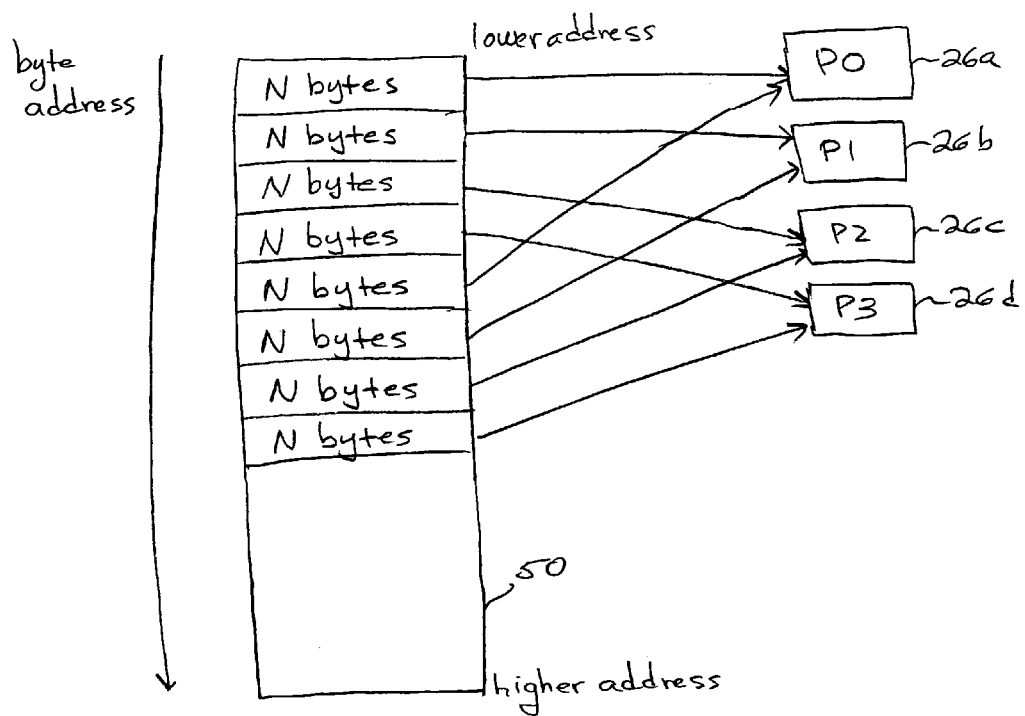
FIG. 4 shows the partitioning of the memory in which the memory as linear array of bytes is mapped to the partitions in an interleaved fashion.

Partitioning of the memory is shown in FIG. 4 and involves mapping a linear array of bytes to the partitions in an interleaved fashion. In particular, ranges of byte addresses in the linear array are mapped to the various partitions 26a-26d. Preferably, the mapping is such that the lower address bits are mapped to a particular partition so that the memory load is approximately evenly balanced over the partitions. In one embodiment, each partition is mapped to an 8 byte range of memory locations. In a different embodiment, each partition is mapped to a 16 byte range of memory locations but any size mapping can be used without departing from the spirit and scope of the invention. A memory access request can start on any partition and end on any partition as long as it does not wrap around and touch the starting partition. If the transfer size of a request is so large that it would violate this rule, then the request, itself, is broken up to multiple requests each satisfying the rule.

If the bus size of a partition is smaller than the range of locations mapped to that partition then multiple accesses are made of the partition until the range of locations in the linear map for that partition is satisfied. For example, if a partition is mapped to a range of locations spanning 16 bytes, but the data bus for the partition is only 8 bytes, then two accesses are made of the partition.

In operation there are two cases to consider. In the first case, a client makes a request that maps to exactly one partition in size and alignment. This case involves only one partition and some clients are dedicated to only one partition to simplify accesses for that client. In the second case, a client makes a request that spans two or more partitions. This requires that the request be split up and routed to two or more partitions for servicing of the request. The request can start at any partition. In the subcase of a write request, the write data are split and the write data and write request are routed to the various partitions. Once the write is retired in the arrays for the affected partitions, the write is completed. In the subcase of a read request, the read request is routed to the proper partitions and as the read request is completed by each of the affected partitions the read data is collected and returned to the client.

The partition data bus width and client data bus width may be different. A client with a wider data bus than that of the partition may consume several clocks of partition transfer time. Alternatively, a client with a data bus width that is smaller than that of a partition can request a burst having a size that requires only one clock cycle of the partition to access the data from that partition but requires many clock cycles to multiplex the partition's data onto the smaller client data bus. The read circuitry for the narrow client is configured to use several clocks to multiplex the data from the partition onto the narrow client bus. This ensures that unused data is not fetched, and isolates the low bandwidth client from the high bandwidth memory system.

Figure 5A:
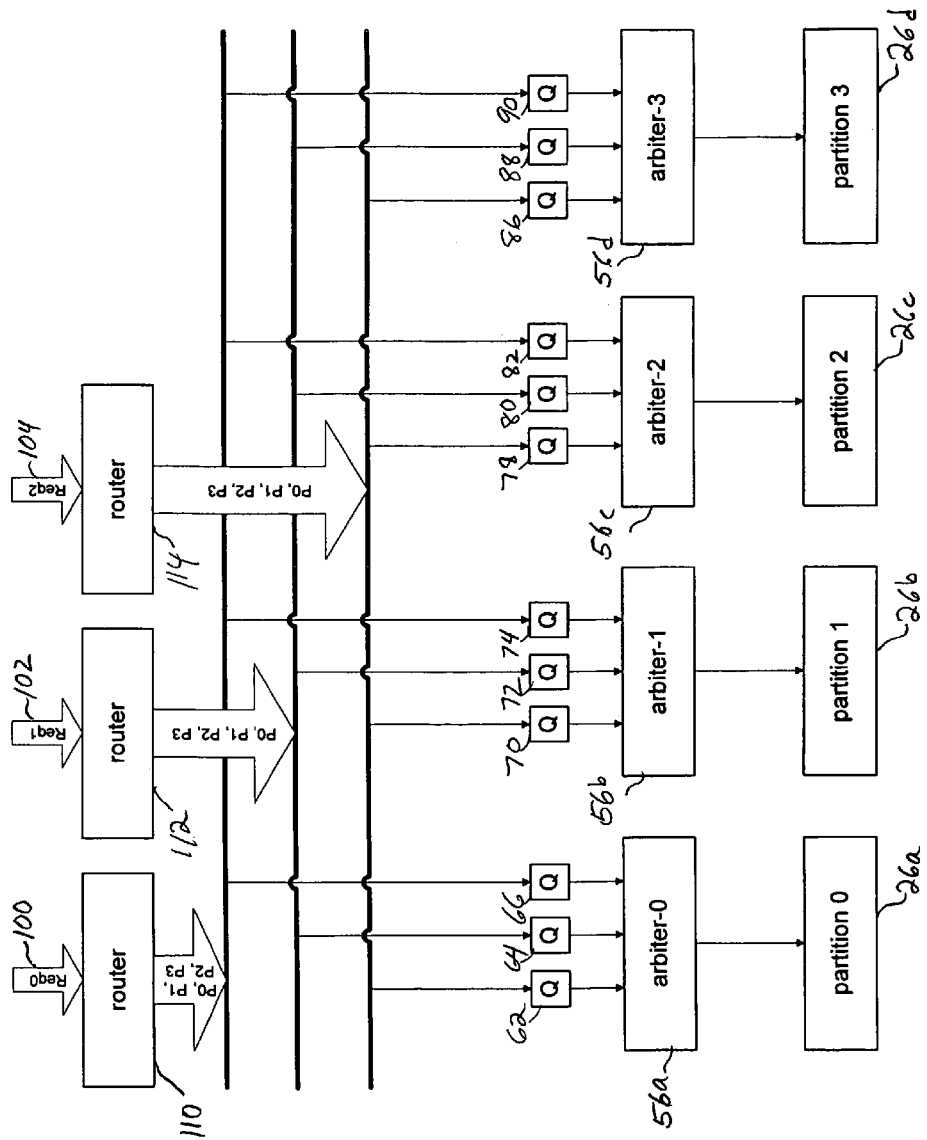
FIG. 5A shows a block diagram for the address, command and write data path for the memory system of the present invention.

FIG. 5A shows a block diagram for the address, command and write data path for the memory system of the present invention. For convenience, four memory partitions 26a, 26b, 26c, 26d are shown, but any number of partitions is contemplated for the present invention. Each partition has an arbiter, 56a, 56b, 56c, 56d, having an output that supplies requests to the partitions and a number of inputs, each of which connects to a client queue 62-66, 70-74, 78-82, 86-90. Each arbiter 56a-56d prioritizes the servicing of requests at its inputs according to a priority policy and each client queue 62-66, 70-74, 78-82, 86-90 that is connected to an arbiter input receives a memory partition request derived from the one or more memory clients 100, 102, 104, such as the various graphics engines mentioned above. While the figure shows three clients, any number of memory clients is possible as long as the necessary hardware is provided for each client.

Priority policies for the arbiters 56a-56d include a least-recently used policy, a fixed priority policy or a round-robin policy or a static or dynamic set of policies depending on the type and nature of the client requests in the client queues. Requests for time critical processes such as display updates or other isochronous processes are given higher priority over requests that have less strict timing requirements.

Any number of clients can request memory operations of the partitions; three clients are shown for convenience. For each client, there is a router 110, 112, 114 that determines, based on an address and reference size contained in the client's request, the one or more partitions 26a-26d, that are needed to service the request. If, in the example shown, each partition 26a-26d, has an effective address map width of W*8 bits (W bytes) then the router 110-114 decodes a portion of the address in the request to determine which of the W-byte partitions should service the request. In addition to the decoding function of the router, the router, in some versions of the invention, also performs address mapping or address translation functions if they are required for a particular application. The router can also perform the function of breaking up a request that is so large is violates the no-wrap around rule. The router then issues requests to the client queues each of which meets the no-wrap rule.

Memory clients 100-104 can place a partition request into one of the client queues 62-66, 70-74, 78-82, 86-90 independently of any other client placing a partition request into a different queue. This prevents memory clients from blocking or interfering with each other at least insofar as memory operations are involved. This means that no partition waits on another partition before servicing a memory request. This arrangement improves memory system throughput for memory reads and writes that require fewer than an integer number of all of the partitions. For example, if there are four partitions, then requests requiring 1, 2, or 3 or 5, 6, or 7 partitions receive improved service. Requests that require an integer number of all four partitions incur no loss in performance in the partitioned memory system.

Figure 5B:
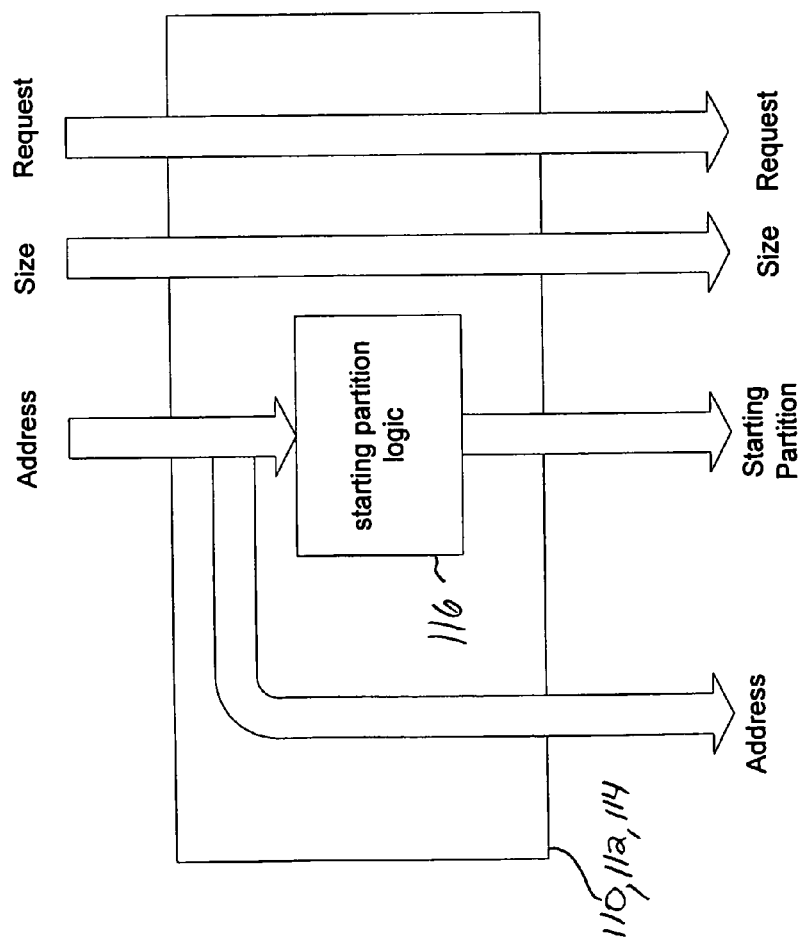
FIG. 5B shows one implementation of the router of FIG. 5A.

FIG. 5B shows one implementation of logic present in the router of FIG. 5A. The router passes through the request and its address and transfer size information and derives the starting partition information by means of a starting partition logic block 116. The starting partition and size are used by the router to determine which partition client queue to load with a request.

Figure 5C:
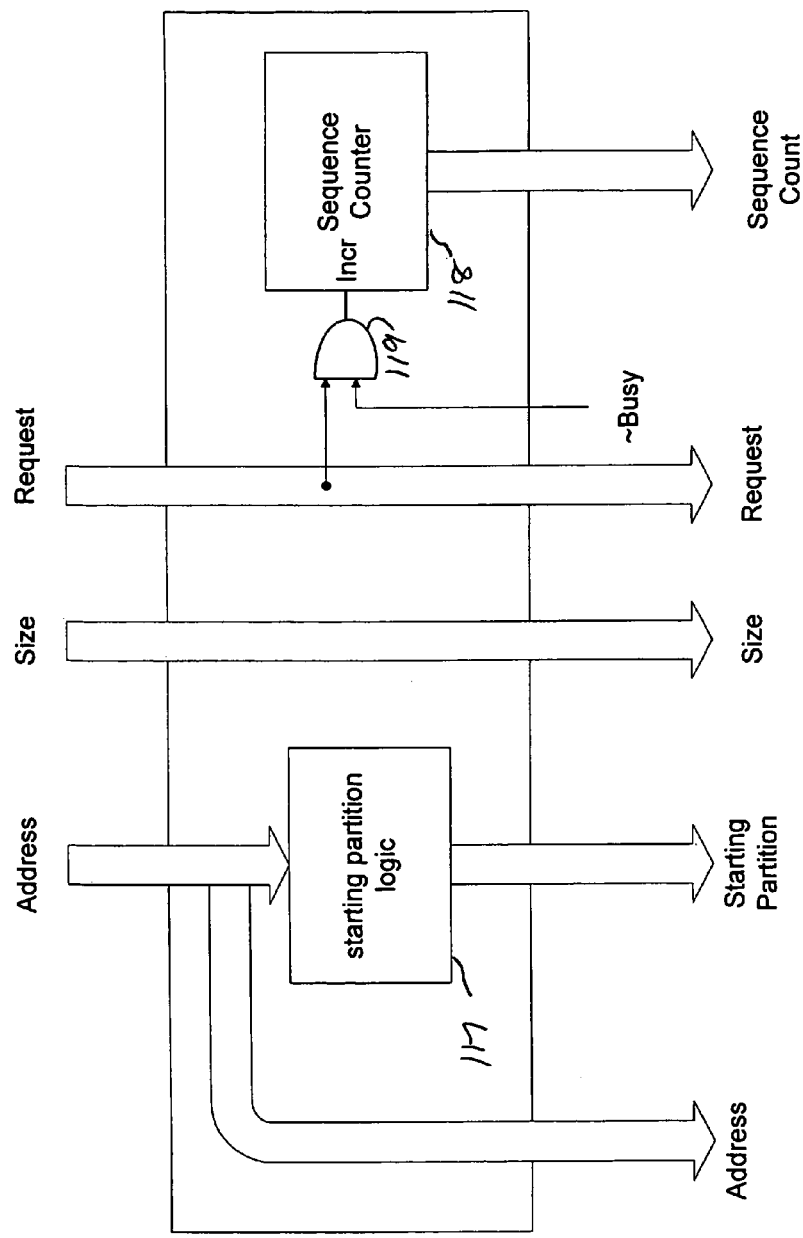
FIG. 5C shows another implementation of the router of FIG. 5A.

FIG. 5C shows another implementation of logic present in the router of FIG. 5A. In this case, the router passes through the request and its address and transfer size information and derives not only the starting partition information but also a sequence count by means of sequence counter 118. Sequence counter 118 is incremented for each new request as long as there is a not busy condition according to gate 119. The starting partition and size are used by the router to determine which partition client queue to load with a request.

Figure 6A:
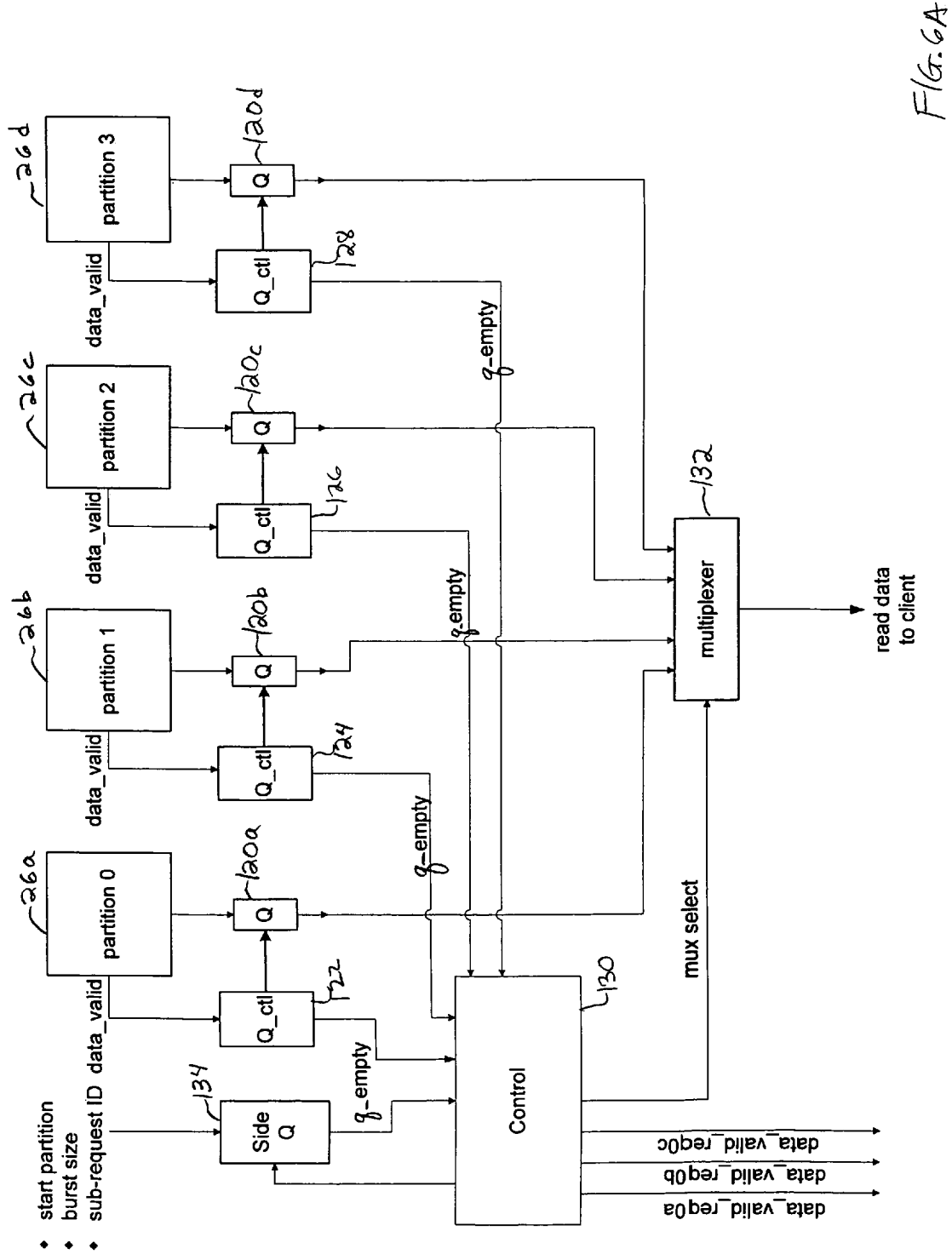
FIG. 6A shows a block diagram for the read data path in accordance with one version of the present invention.

FIG. 6A shows a block diagram for the read data path in accordance with one version of the present invention. In this case, the partition data bus width is the same as the client's data bus width. Read requests that touch only a single partition and burst read requests that span a number of partitions must be serviced by those partitions and the read data must be presented in the order requested by the client back to the client. To handle this case and to prevent deadlocks, the hardware of FIG. 6A is required for each client.

For a particular client, each partition in FIG. 6A has a read queue 120a-120d that captures the read data from the partition array 26a-26d. This read queue 120a-120d is controlled by a queue controller 122, 124, 126, 128 that is connected to the read queue 120a-120d, the partition 26a-26d, and to a control block 130. Each of the read queue controllers 122-128 receives a data_valid signal from the partition 26a-26d and provides a queue control signal, q_empty, to the control block 130. Each of the read queues 120a-120d connects to the input of a multiplexer 132 whose output provides the read data to the client to which this circuitry is dedicated. Another queue, called a side queue 134, receives information regarding the starting partition for the read request, sub request ID, and the burst size, if any, for the read request. Sub-requestors 153, 155, 157, in FIG. 7 require sub request IDs because such sub clients share a single request path. In FIG. 6A, control block 130 is connected to the multiplexer 132 to selectively couple one of the inputs to the output of the multiplexer as the data becomes available at the output of the read queue 120a-120d, respectively connected to each multiplexer input. The control block also provides signals to the queue controllers for use in controlling the queues and provides the data valid signals, data_valid_req0a, data_valid_req0b, data_valid_req0c, for each of the clients.

The hardware according to the block diagram of FIG. 6A, operates to collect the various parts of read data that are supplied by the partitions 26a-26d in response to a read request. The partition loads the read data into read queues corresponding to the client that issued the read by using the data_valid signal as a load signal for the client read queue. For example, if the read request starts at partition 1, 26b as determined by the data in the side queue 134 that is received by the control block 130, then when the queue controller 122-128 for a partition 26a-26d discovers that data is ready in the read queue for that partition by means of the q_empty signal becoming false, the control block 130 sets the multiplexer 132 to output the read queue for partition 1, 26b to the particular client. Next, the queue controller for partition 2, 26c is checked to see if the data is ready from partition 2. If so, then the multiplexer 132 is set to output the read queue for partition 2 to the client. This sequence continues until the full amount of data requested by the client is sent to the client. If the data bus size of a partition is smaller than the range of locations mapped to that partition then multiple read data of the partition may be returned until the range of locations in the linear map for that partition is satisfied.

In some cases a memory client can accept data in an out-of-order fashion. This means that instead of accepting data, lowest byte first for example, the client can accept data in a number of other pre-specified orders. In these cases, the queue controllers 122-128 operate to cause the queues 120a-d to output data in a non-first-in-first-out order in order to provide read data in the particular order in which the clients is accepting the data. This increases throughput of the memory system because a client that can receive data out-of-order can accept data as soon as it is available from a partition.

Figure 6B:
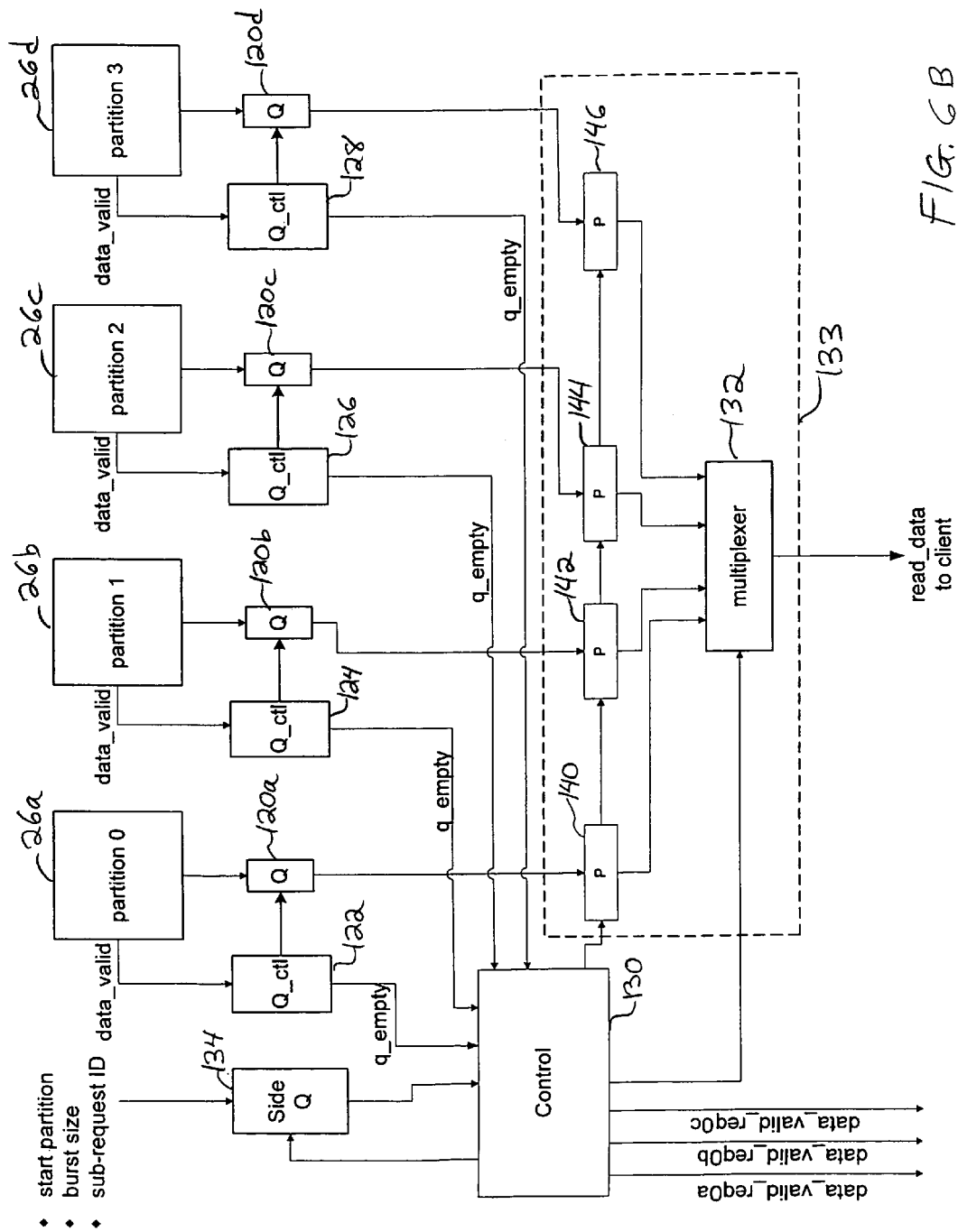
FIG. 6B shows a block diagram for the read data path in accordance with one version of the present invention with partition-size interface hardware.
Figure 6C:
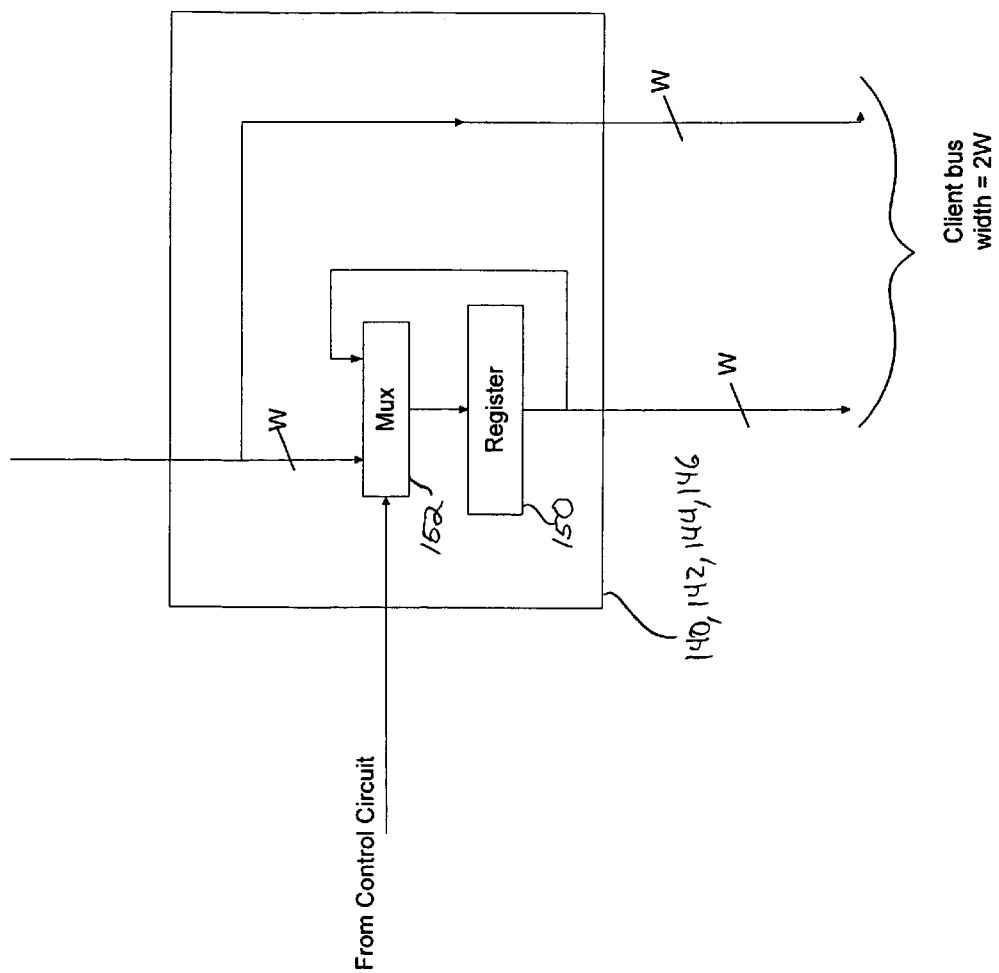
FIG. 6C shows an implementation of the interface hardware included in the multiplexer circuitry of FIG. 6B.
Figure 6D:
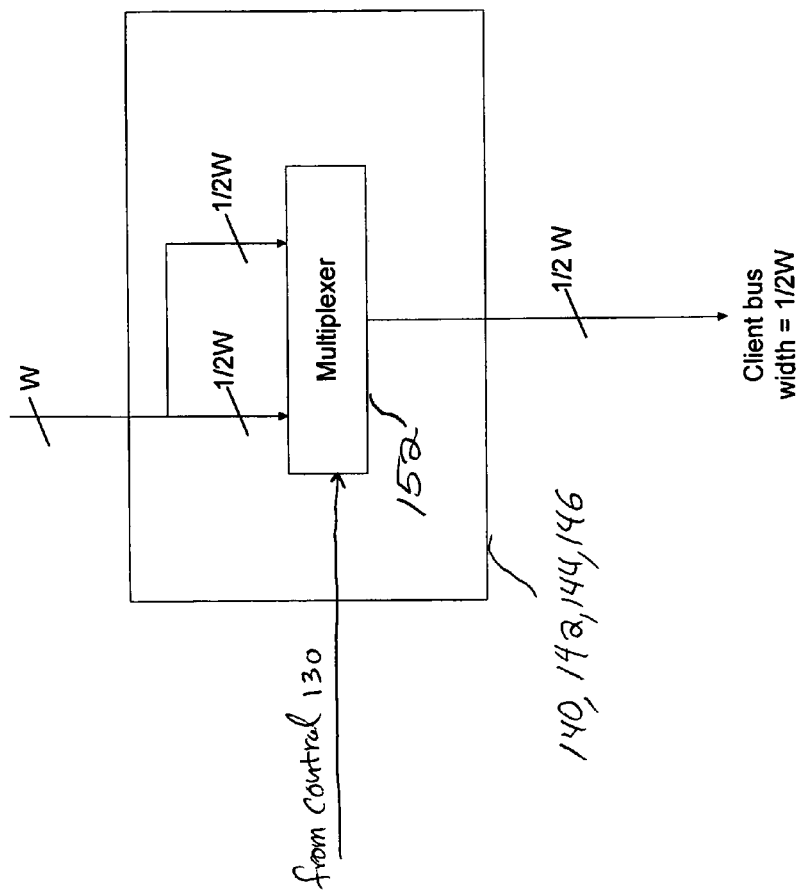
FIG. 6D shows another implementation of the interface hardware included in the multiplexer circuitry of FIG. 6B.
Figure 6E:
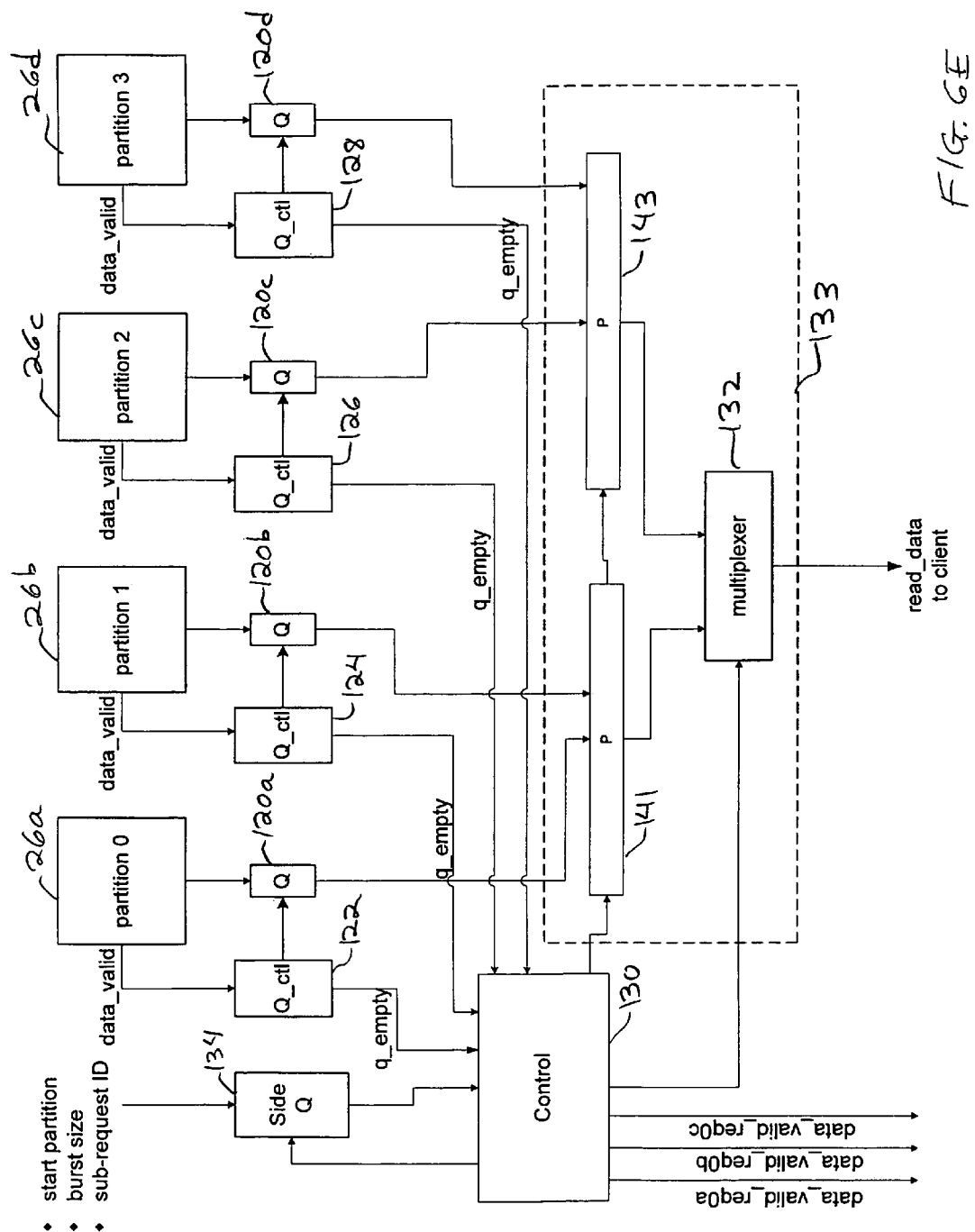
FIG. 6E shows another block diagram for the read data path in accordance with another version of the present invention with partition-size interface hardware.
Figure 6F:
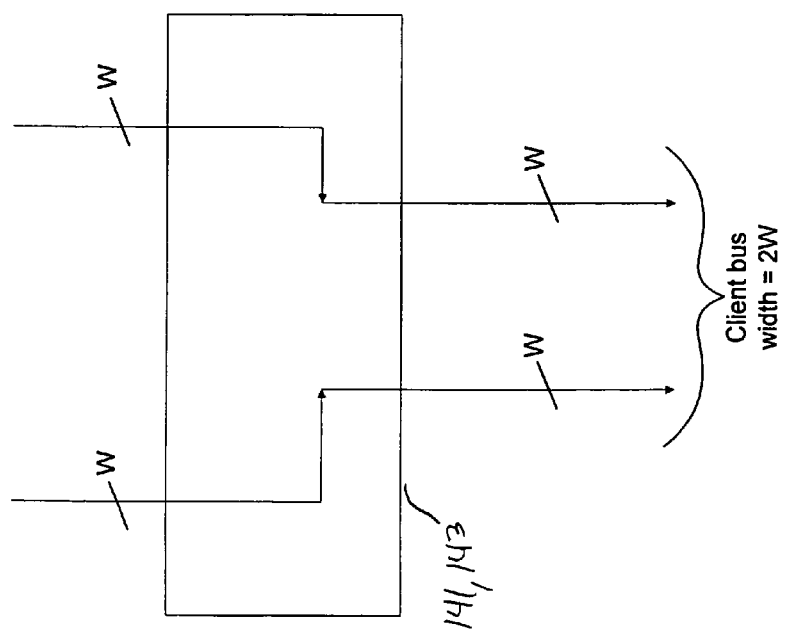
FIG. 6F shows an implementation of the interface hardware included in the multiplexer circuitry of FIG. 6E.
Figure 6G:
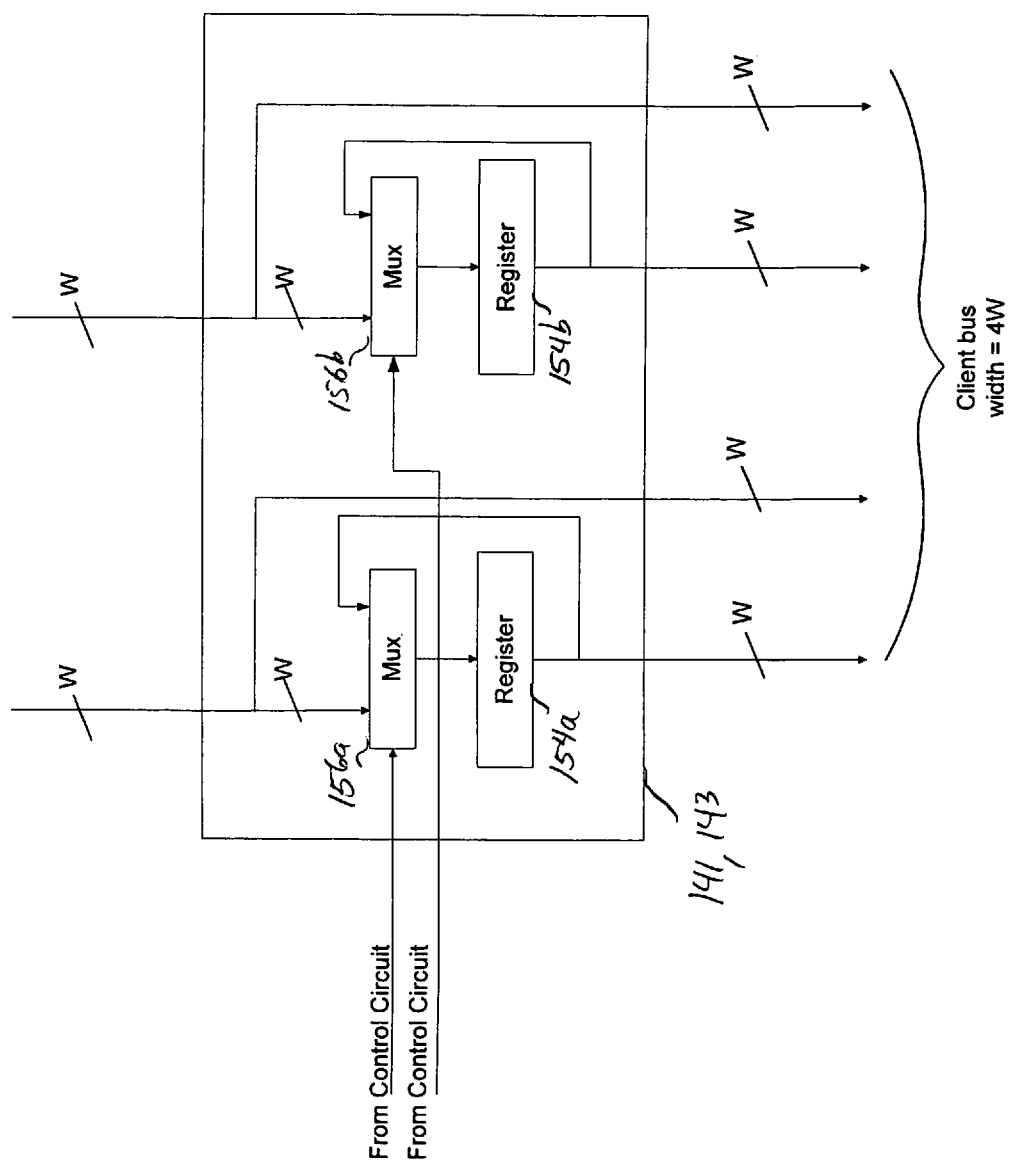
FIG. 6G shows another implementation of the interface hardware included in the multiplexer circuitry of FIG. 6E.
Figure 6H:
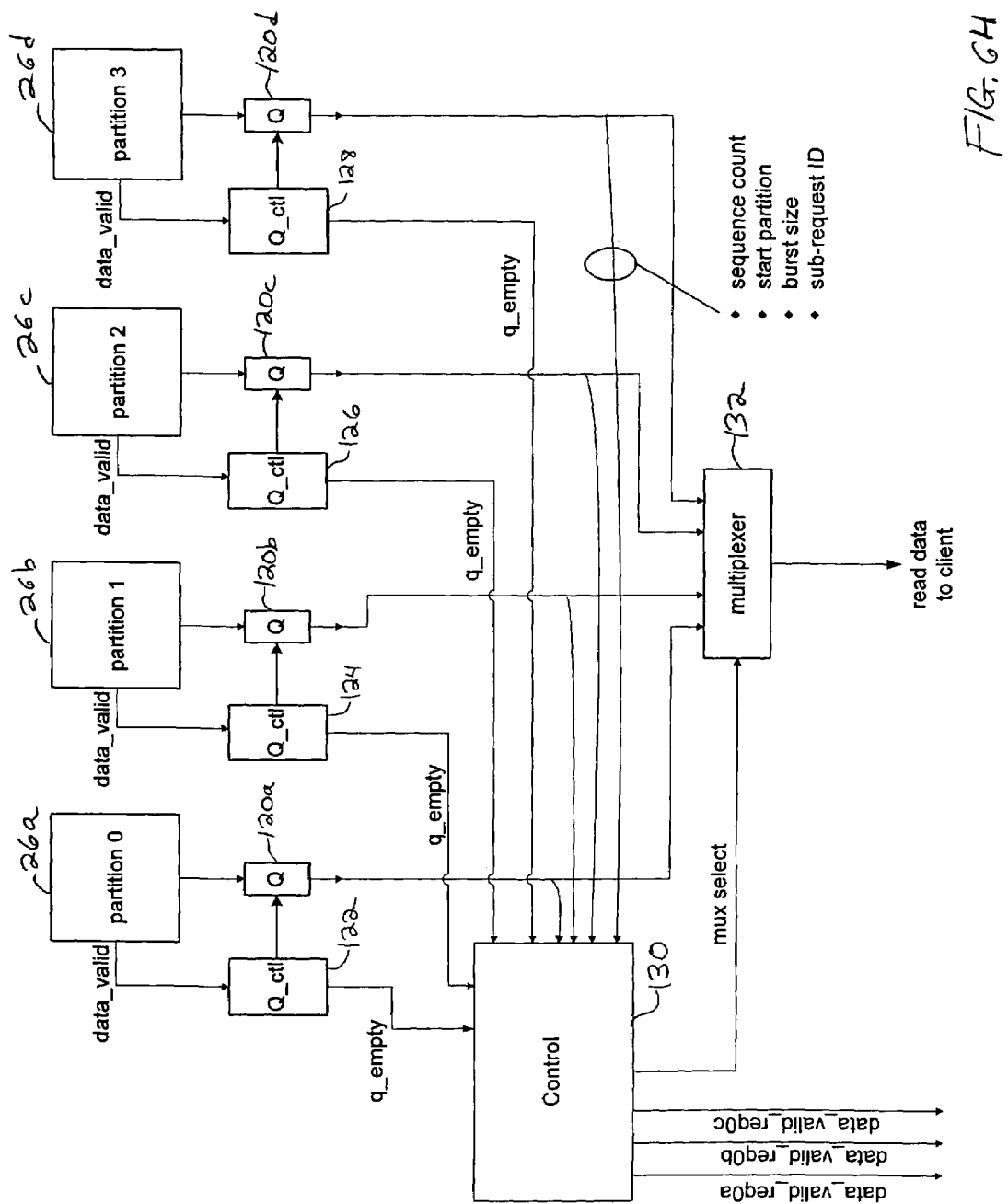
FIG. 6H shows an implementation of the read data path using sequence counts.
Figure 7:
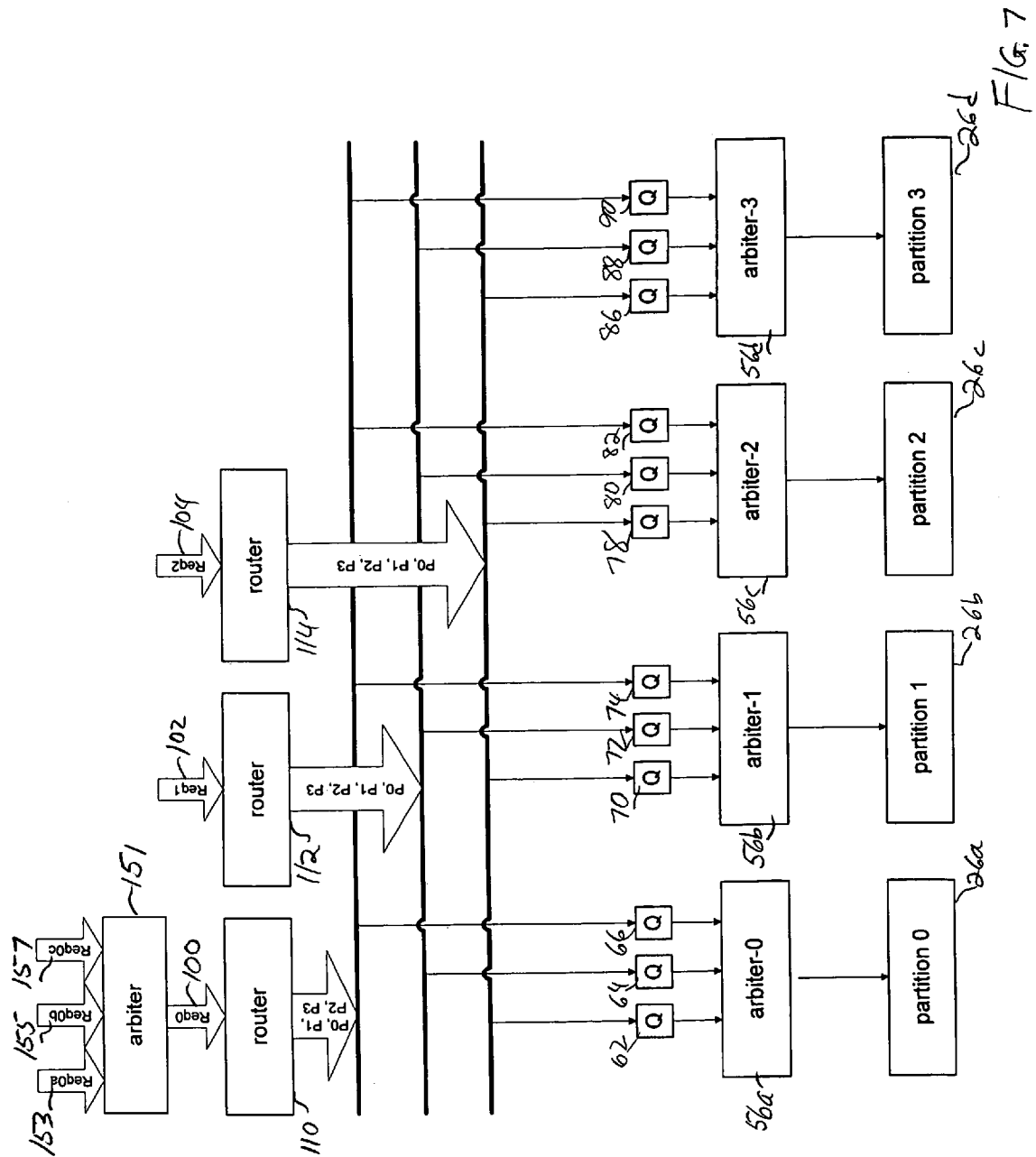
FIG. 7 shows an alternative embodiment of the command and write data path having an arbiter that permits multiple clients to share a router and client queues.

The embodiment of FIG. 6H does not use a side queue, but instead provides each client with a sequence number counter or equivalent mechanism, which increments for each reference that is issued by the client. The sequence count is conveyed to all servicing partitions along with start partition, transfer size and sub request ID if there are multiple clients sharing the same router as shown in FIG. 7. The sequence count is passed through the partition and loaded into the read queues 120a-d with the read data when that partition's read return data returns from memory. The outputs of read queues 120a-d transfer this information to controller 130. Controller 130 examines the partition read queue outputs and selects read data tagged with the next sequence number only after exhausting read data tagged with the current sequence count.

FIG. 6B shows a block diagram for the read data path in accordance with one version of the present invention with partition-size interface hardware, which is needed when the data bus width of a client is different than that of the partition. The data bus width of a partition may be smaller than that of a client, such that the partition must be cycled more than once to obtain enough data to match the bus width of the client. In this case the control logic operates to cause a burst of data (several data words) to be produced from the partition. Interface hardware blocks 140, 142, 144, 146 for holding the burst data are additionally included in the multiplexer circuitry 133. The multiplexer circuitry selects one of the interface blocks to provide some or all of the burst data.

FIG. 6C shows an implementation of the interface hardware included in the multiplexer circuitry of FIG. 6B. This circuitry adapts a W wide partition to a client bus having a width of 2W. A register 150 and multiplexer 152 capture and hold a portion of the burst data and the remaining portion of the burst data is provided by the associated read queue. In other embodiments, both W-wide paths are provided by registers.

FIG. 6D shows another implementation of the interface hardware included in the multiplexer circuitry of FIG. 6B. In this implementation, the partition bus is W bytes wide and the client bus is ½ W wide. A multiplexer 152 adapts the wider bus to the smaller bus.

FIG. 6E shows another block diagram for the read data path in accordance with another version of the present invention with partition-size interface hardware. In this case, the client bus width is larger than the partition address map size. In this example, there are two interfacing blocks included within the multiplexer circuitry 133. The first interface block 141 is connected to receive data from read queues 120a and 120b and the second interface block 143 is connected to receive data from read queues 120c and 120d.

FIG. 6F shows an implementation of the interface hardware included in block 143 P of the multiplexer circuitry of FIG. 6E. The interface hardware simply passes through the two W-byte sized busses to provide a bus that is 2W, because the outputs of a pair of read queues are available to the multiplexer circuitry.

FIG. 6G shows another implementation of the interface hardware included in the multiplexer circuitry of FIG. 6E. The interface block shown adapts a partition bus having a width W and address map width 2W to a client bus that has a width 4W. A pair of registers, 154a, 154b, and a pair of multiplexers, 156a, 156b, are used to capture multiple data items from the pair of read queues to which each of the interface block, 141, 143 is connected.

FIG. 7 shows an alternative embodiment of the command and write data path. In this embodiment, an arbiter 151 is added to prioritize a number of sub-requestors 153, 155, 157 that share a command and write data path in order to reduce the hardware that would otherwise be needed for each requester. Each sub-requestor has a sub-request ID. The data_valid signals of FIGS. 6A and 6B and the sub-request ID indicate which of sub-requestors 153, 155, 157 should collect the read data.

Figure 8:
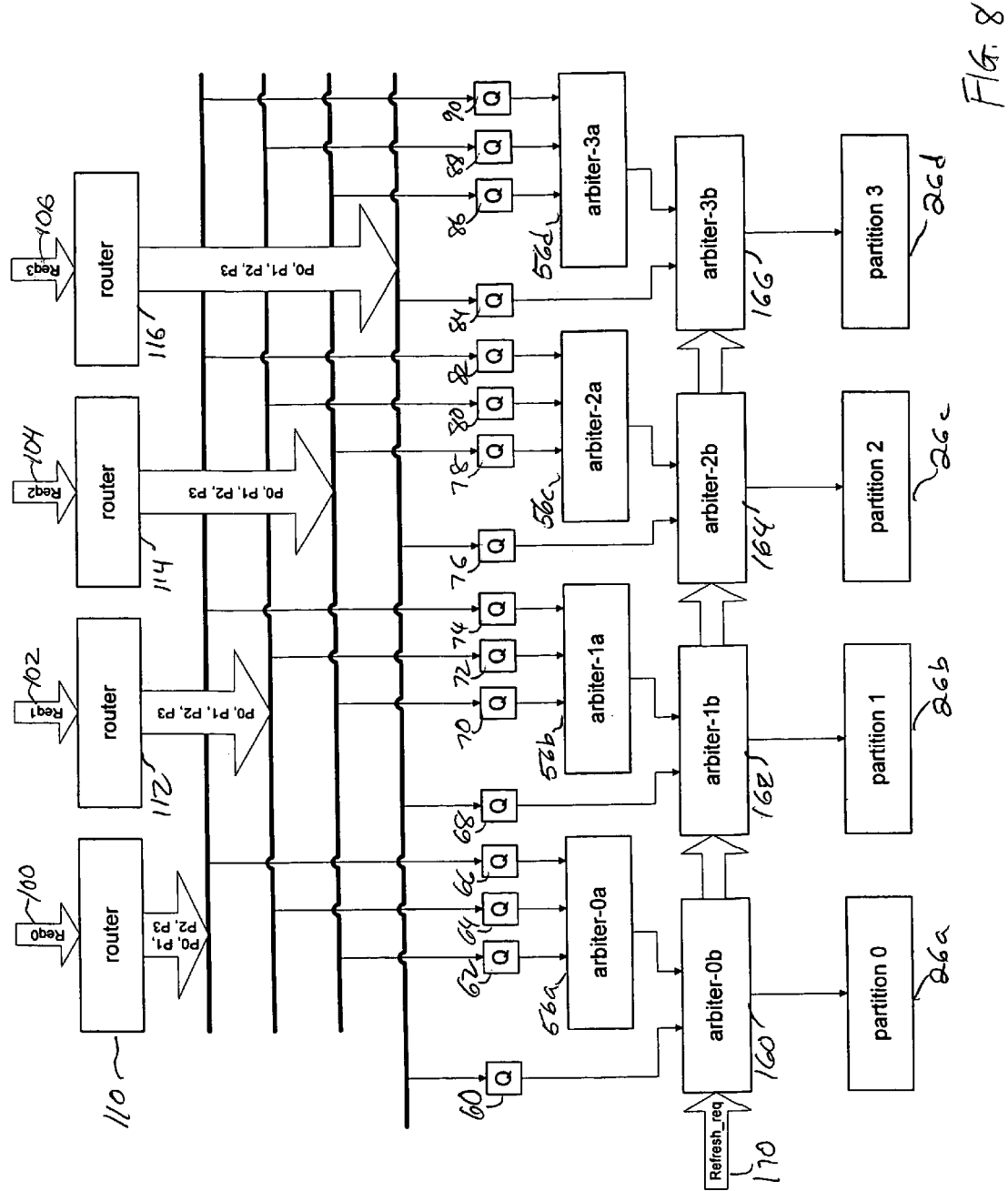
FIG. 8 shows another alternative embodiment of the command and write path in which the arbitration for access to a partition is in two parts.

FIG. 8 shows another alternative embodiment of the command and write path in which the arbitration for access to a partition is in two parts, arbiter-0a 56a-56d, and secondary arbiter-0b 160-166, and there is a preferential path for a high priority requester 106, which, in the figure, is Req3. Low priority requesters arbitrate to gain access to the partitions using first the arbiter-0a and then secondary arbiter-0b circuitry but the high priority request via client queues 60, 68, 76, 84 arbitrates to gain access using only the arbiter-0b circuitry 160-166. It is also advantageous to introduce a refresh requester 170 as shown and memory device initialization requests into the arbiter-0b 160-166 blocks.

Figure 9:
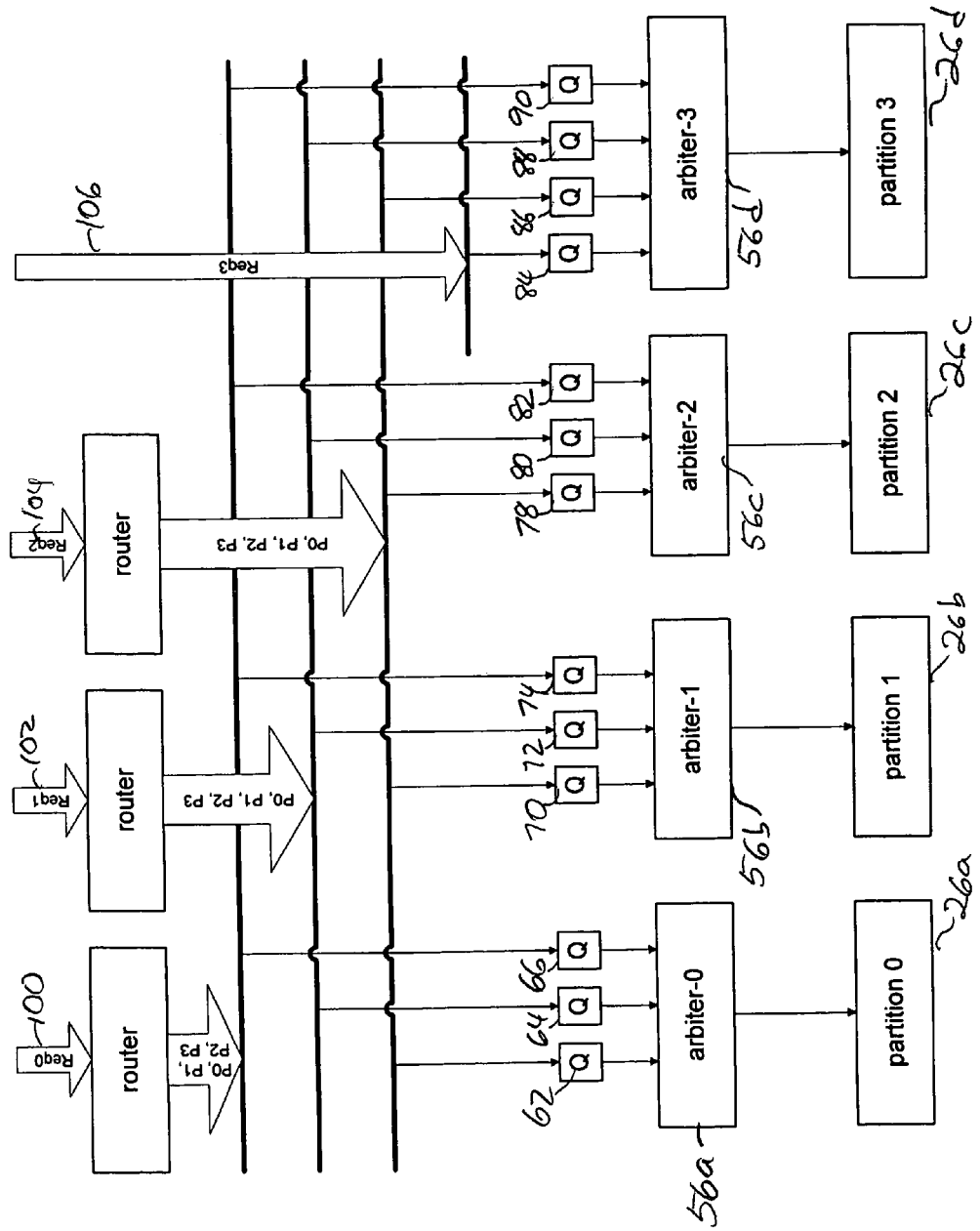
FIG. 9 shows yet another alternative embodiment of the command and write path in which the translation block for requester is removed.

The above describes the cases in which a (i) processing request is sent to a client, (ii) the client performs the requested processing and makes memory requests and (iii) the memory system routes the memory requests to the proper client queues. However, if a memory client is itself partitioned into an number of processing stages, an alternative is (i) to determine the one or more processing stages required for a processing request, (ii) route the processing requests to the proper stage for processing and then (iii) send the request directly to the appropriate client queue which is connected to a specific partition. A single memory client that is not partitioned into stages may also be restricted to only access data in a single partition and connect directly only to that partition. FIG. 9 shows this alternative embodiment of the command and write path in which there is no router for client 3 106 because the client directs its requests via client queue 84 only to a particular partition, partition 3, 26d. For these partitioned clients, such as a raster-operation pipeline, this simplifies and speeds up the access to the memory subsystem. In addition, the read path is simplified because the read data is directly returned to the requester from the dedicated partition. The multiplexer and control circuitry of FIG. 5 is not required for a requester that is dedicated to a particular partition.

One or more of the above-described embodiments can be combined according to the embodiments that are needed for the types and number of memory clients and all such combinations are within the spirit and scope of the present invention.

Figure 10:
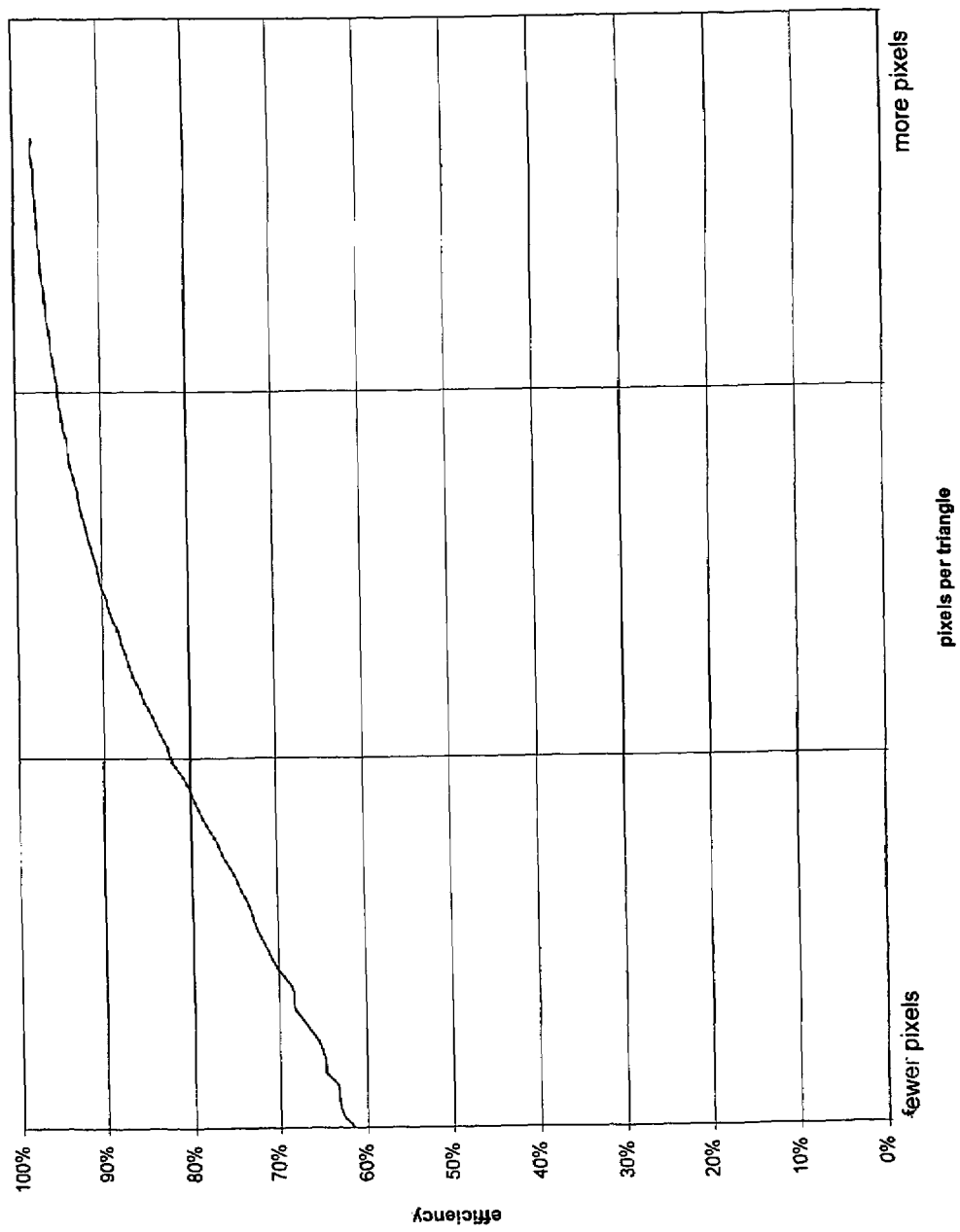
FIG. 10 shows the degree of improvement of the present invention over the prior art.

FIG. 10 shows a plot illustrating the improved fetching efficiency of the present invention. For the same small triangle size, between approximately 10 and 100 pixels there is a marked improvement in the efficiency.

Although the present invention has been described in considerable detail with reference to certain preferred versions thereof, other versions are possible. Therefore, the spirit and scope of the appended claims should not be limited to the description of the preferred versions contained herein.

What is claimed is:

1. An apparatus for a memory system, comprising:
a memory controller to service memory requests issued by a plurality of memory clients to a memory with each memory request having an associated data transfer size, the memory controller providing a non-partitioned view of a memory array to the plurality of memory clients while dividing a memory access bus into individual bus partitions, each of which is a fraction of said memory access bus size, said memory controller partitioning information within said memory array into independently accessible memory partitions, said memory controller routing data between said independently accessible memory partitions and said plurality of memory clients via said individual bus partitions, said memory controller determining which memory requests are to be serviced in particular clock cycles via one or more of said independently accessible memory partitions and said individual memory bus partitions;
wherein said plurality of memory clients submit variable data transfer size memory requests to the memory controller and the memory controller identifies memory requests requiring a subset of said independently accessible memory partitions and determines if another memory request can be serviced in parallel via another subset of said independently accessible memory partitions to improve throughput.

2. The apparatus of claim 1 wherein said memory controller includes control logic to select one or more of said individual bus partitions to route data in response to a data request from one of said plurality of memory clients.

3. The apparatus of claim 1 wherein said memory controller maps data to said independently accessible memory partitions in an interleaved fashion to balance memory load across said independently accessible memory partitions.

4. The apparatus of claim 1 wherein said memory controller has individual queues for corresponding bus partitions.

5. The apparatus of claim 4 wherein said memory controller further comprises a multiplexer to combine data from said individual queues.

6. The apparatus of claim 4 wherein said memory controller includes an arbiter circuit to prioritize requests from a sub-set of said plurality of memory clients.

7. The apparatus of claim 1 wherein partitioning of the memory includes mapping a linear array of bytes to the independently accessible memory partitions so that ranges of byte addresses in the linear array are mapped to particular partitions.

8. The apparatus of claim 7 wherein said memory controller maps ranges of byte addresses to said plurality of independently accessible memory partitions in an interleaved fashion to balance memory load across said independently accessible memory partitions.

9. A method of servicing data requests, comprising:
receiving a memory requests from a plurality of memory clients to access a unitary memory subsystem, each individual memory request having an associated data transfer size within a range of variable data transfer sizes;
assigning said memory requests to a plurality of independently accessible memory partitions imposed upon said unitary memory subsystem;
wherein the plurality of memory clients submit variable data transfer size memory requests and in which for a particular memory request requiring a subset of said independently accessible memory partitions said assigning includes determining if another memory request can be serviced in parallel via a different subset of said independently accessible memory partitions to improve throughput.

10. The method of claim 9 further comprising facilitating ordered read data delivery to prevent deadlocking across said individual bus partitions.

11. The method of claim 9 further comprising prioritizing requests from a sub-set of said plurality of memory clients.

12. The method of claim 9 further comprising pre-arbitrating requests from a sub-set of low-bandwidth memory clients of said plurality of memory clients.

13. The method of claim 12 further comprising treating said sub-set of low-bandwidth memory clients as a single memory client.

14. The method of claim 9 further comprising assigning individual memory partitions of said independently accessible memory partitions to service individual memory clients of said plurality of memory clients.

15. The method of claim 9 further comprising balancing data locality requirements to facilitate memory access efficiency.

16. A memory system, comprising:
a memory array;
a memory access bus connected to said memory array;
a plurality of memory clients, each memory client issuing memory requests, each individual memory request having an associated data transfer size; and
a memory controller connected between said memory access bus and said plurality of memory clients, said memory controller providing a non-partitioned view of said memory array to said plurality of memory clients, while dividing said memory access bus into individual bus partitions, each of which is a fraction of the memory access bus size, said memory controller partitioning information within said memory array into independently accessible memory partitions, said memory controller routing data between said independently accessible memory partitions and said plurality of memory clients via said individual bus partitions, said memory controller determining which memory requests are to be serviced in particular clock cycles via one or more of said independently accessible memory partitions and said individual bus partitions;
wherein said plurality of memory clients submit variable data transfer size memory requests to the memory controller and said memory controller identifies memory requests requiring a subset of said independently accessible memory partitions and determines if another memory request can be serviced in parallel via another subset of said independently accessible memory partitions to improve throughput.

17. The memory system of claim 16 wherein said memory controller includes control logic to select one or more of said individual bus partitions to route data in response to a data request from one of said plurality of memory clients.

18. The memory system of claim 16 wherein said memory controller maps data to said independently accessible memory partitions in an interleaved fashion to balance memory load across said independently accessible memory partitions.

19. The memory system of claim 16 wherein said individual bus partitions have corresponding individual queues.

20. The memory system of claim 19 further comprising a multiplexer to combine data from said individual queues.

21. The memory system of claim 19 wherein said individual queues have corresponding arbiter circuits.

22. The memory system of claim 21 wherein said arbiter circuits include an arbiter circuit to prioritize requests from a sub-set of said plurality of memory clients.

23. The memory system of claim 22 wherein said sub-set of said plurality of memory clients share a command and write data path.

24. The memory system of claim 22 wherein each memory client of said sub-set of said plurality of memory clients has a sub-request ID.

25. The memory system of claim 24 wherein individual memory partitions of said independently accessible memory partitions are assigned to solely service individual memory clients of said plurality of memory clients.

26. The memory system of claim 25 wherein said individual queues include request queues and read data return queues to balance data locality requirements to facilitate memory access efficiency.

27. The memory system of claim 22 wherein said arbiter circuit pre-arbitrates requests from a sub-set of low-bandwidth memory clients.

28. The memory system of claim 27 wherein said arbiter circuit treats said sub-set of low-bandwidth memory clients as a single memory client.

29. The memory system of claim 19 wherein said individual queues facilitate ordered read data delivery and thereby prevent deadlocking across said individual bus partitions.

30. The memory system of claim 29 wherein said individual queues process read data requests that span a plurality of individual bus partitions.

* * * * *